United States Patent Office

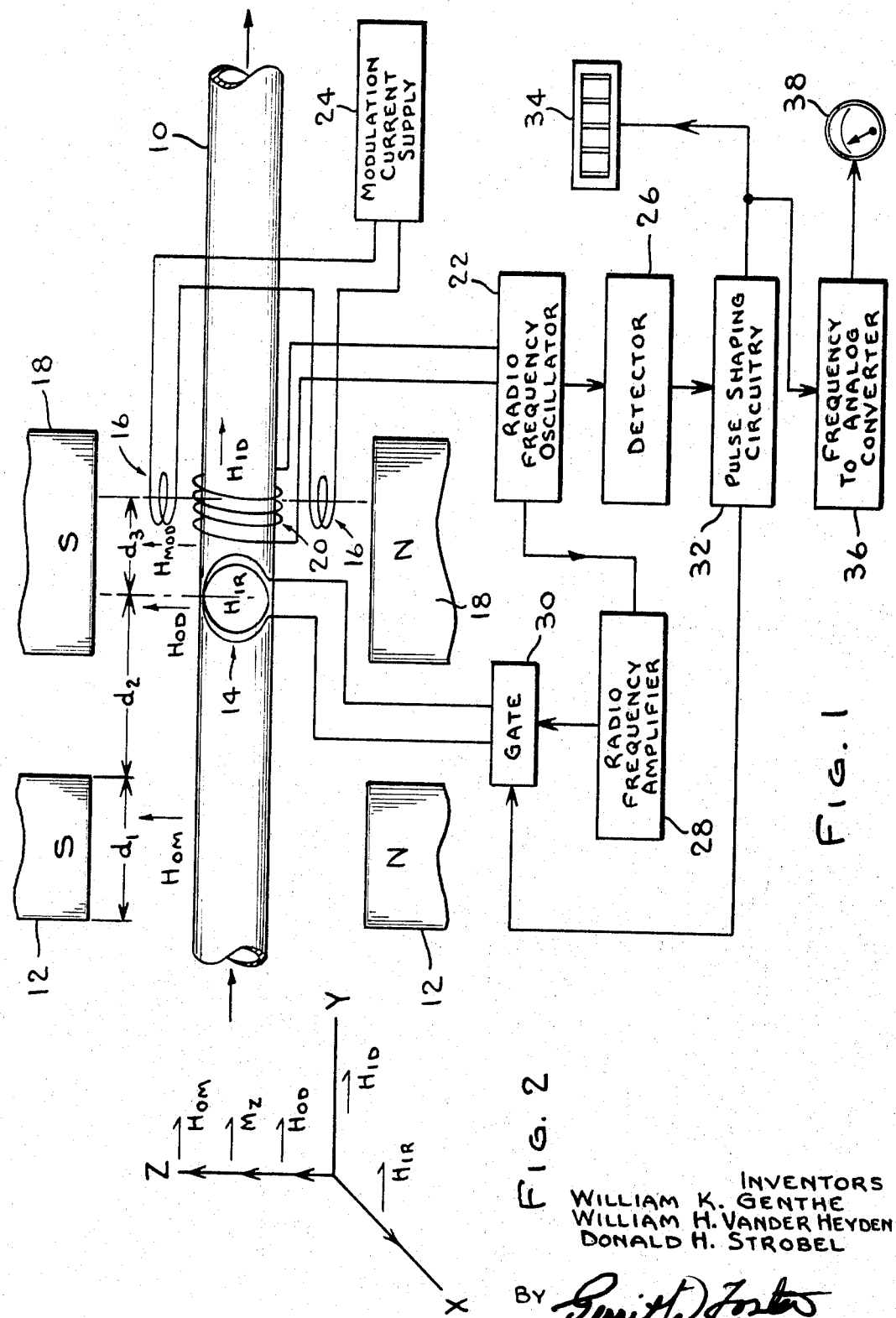

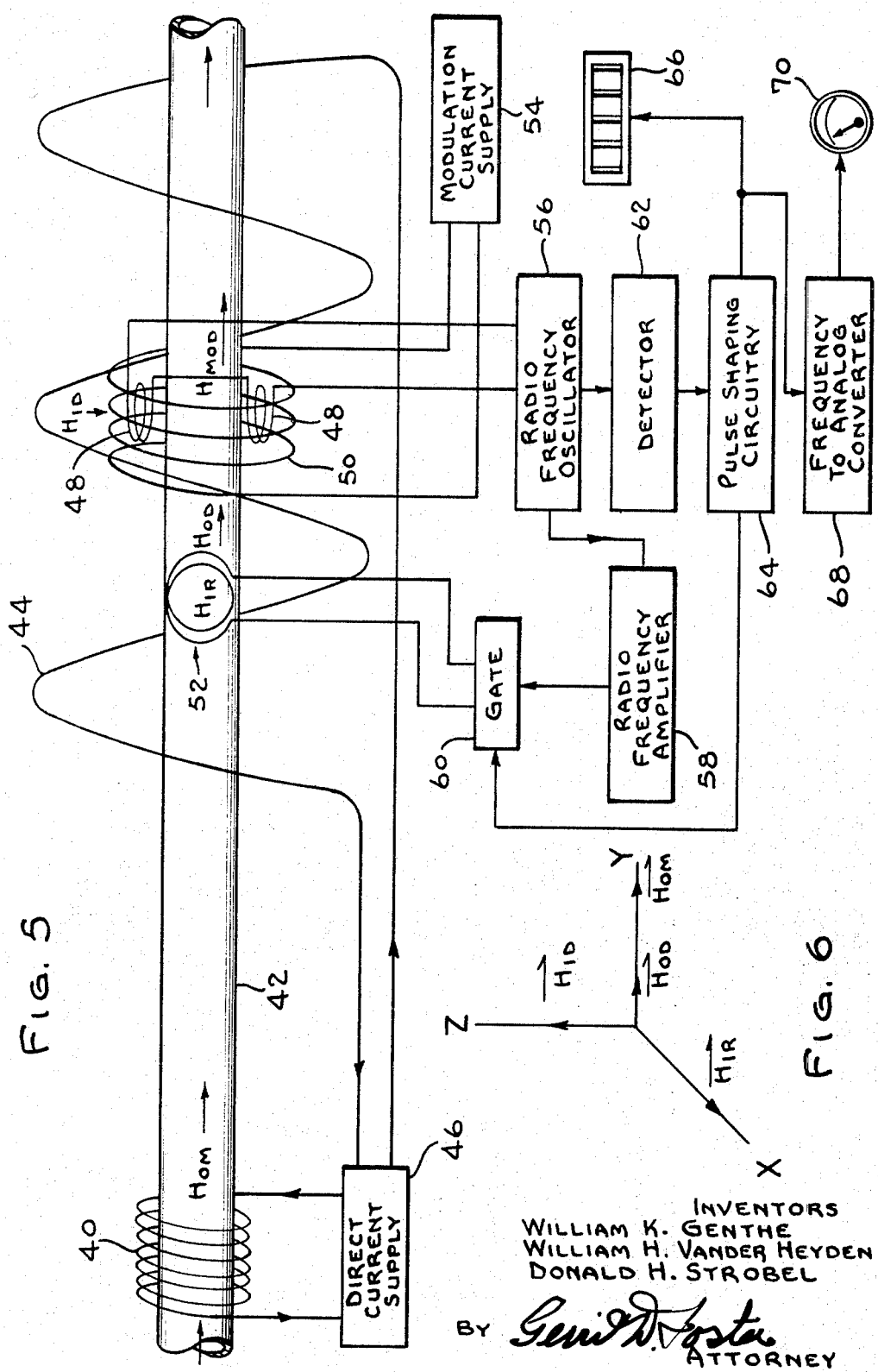

3,419,793
Patented Dec. 31, 1968

3,419,793
VOLUMETRIC FLOW MEASURING DEVICE EMPLOYING PULSED PARAMAGNETIC RESONANCE
William K. Genthe and William H. Vander Heyden, Menomonee Falls, and Donald H. Strobel, Cedarburg, Wis., assignors to Badger Meter Manufacturing Company, Milwaukee, Wis., a corporation of Wisconsin
Filed Apr. 2, 1965, Ser. No. 445,117
10 Claims. (Cl. 324—.5)

ABSTRACT OF THE DISCLOSURE

This disclosure relates to a flowmeter employing nuclear magnetic resonance for detecting and metering the flow of fluid having a component with a nuclear magnetic moment. The fluid first passes through a magnetic field, by which a preferred alignment is given to the magnetic moment vectors of the nuclei. A bolus of the fluid is tagged, after being magnetized, by means of a tagging coil which is pulsed with RF energy to demagnetize the bolus. Shortly downstream from the tagging coil is disposed another RF coil with its axis in orthogonal relationship with the axis of the first RF coil and the direction of the magnetizing field, by which magnetic resonance of the fluid is induced, in order to detect the passage of the tagged bolus.

In one embodiment, the magnetizing field and the axis of the demagnetizing coil are perpendicular to the flow direction and the second RF coil is coaxial with it. In a second embodiment, the magnetizing field is coaxial with the flow direction, and the two RF coils are oriented with their axes perpendicular thereto.

---

This invention relates to devices used in making measurements of a flowing medium and, more particularly, to a volumetric flow measuring device.

Volumetric flow measurement is presently accomplished by a variety of mechanisms using such elements as venturi tubes, orifice plates, electromagnetic elements, thermal elements, acoustic elements, turbines, nutating discs, and other inferential and positive displacement elements. Without exception, these methods require either electrical or mechanical contact between the measuring element and the fluid stream. Such contact introduces unavoidable deleterious effects on accuracy or on flow element structure due to deposits, clogging, abrasion, and fouling, particularly when corrosive, abrasive, viscous, or biphase fluids such as slurries are measured. Flow measurements using pressure differential elements, electromagnetic elements, thermal elements, and acoustic elements, are inferred from signals generated by the flow element which are analogs of the flow velocity. This is in contradistinction to flow elements such as the turbine in which the flow measurement is often inferred from a pulsed voltage which is a digital representation of the flow quantity passing through the flow element in unit time. Experience has shown that totalization of flow quantities and measurement of average flow velocity is most simply and accurately accomplished using digital representation rather than analogs.

Accordingly, it is a general object of this invention to provide a simply constructed and yet effective and highly accurate flow measuring device.

Another object of this invention is to provide a flow measuring device which is free from any obstruction in the flow line and in which no electrical or mechanical contact of the measuring elements with the fluid stream is required and which, therefore, is equally well suited for use with homogeneous or non-homogeneous medium, is of sanitary construction and is not subject to deposits, clogging, or fouling.

A further object of this invention is to provide a flow measuring device which provides a digital representation of the quantity of fluid passing through the device in unit time.

A still further object of this invention is to provide a flow measuring device which: is more effective over a wider range of flow rates than is possible with conventional flow meters; maintains high accuracy without recalibration; requires a manimal of maintenance; operates in normal ambient temperatures; and will handle fluids in both laminar and turbulent flow.

For the accomplishment of these objects, this invention makes use of nuclear magnetic resonance, herein disignated, NMR generated using the atomic nuclei of the fluid. More specifically, the fluid is first premagnetized in a strong magnetic field. In one embodiment of the invention, the direction of the magnetization so induced is then rotated through an angle of $90° \pm n$ times $180°$, where $n$ is 0 or a digit from 1 to 9, in a small bolus of the fluid, by means of the application of a suitably oriented pulse of high frequency energy of proper magnitude and frequency. This bolus is thereby "marked" or "tagged" with respect to the fluid preceding and following it, with no observable chemical or physical alteration. The passage of this tagged bolus is detected a short distance downstream by means of an NMR detector of any one of several designs. The detected passage of the tagged bolus retriggers the upstream magnetization rotation pulse so that the pulsing is repetitive and selfsustaining. Each pulse corresponds to the passage of a volume of fluid, equal to the volume between the upstream and downstream coils, which are used to rotate the magnetization and detect the tagged bolus, respectively. The number of pulses occurring in unit time is proportional to the average fluid velocity.

This invention will be discussed in relation to several embodiments of a volumetric flow measurement device using pulsed nuclear paramagnetization in various ways werein an electrical pulse train is generated, carrying volumetric flow rate and flow quantity information. However it should be understood that this invention is not limited to use in a volumetric flow measuring device but will have wider application; for example, it can be used equally well in a mass flow measuring device wherein the density of the fluid is measured by other means such a NMR slow passage pulse height measurement or absorption of gamma or X-radiation. The volumetric flow signal is then multiplied by the density signal to provide mass flow rate information.

The novel features of this invention are set forth in the appended claims. The invention itself, together with additional objects and advantages thereof, will be more clearly understood from a reading of the following description in connection with the accompanying drawings of several preferred embodiments of the invention wherein:

FIG. 1 is a schematic and block diagram showing an NMR system for flow measurement employing premagnetization, rotation of a portion of the premagnetized fluid by a pulse to form a small bolus, and NMR detection of the bolus; the detection of the bolus retriggering the rotation pulse;

FIG. 2 is a vector diagram displaying the orientation of the various magnetic and electromagnetic fields used in the system of FIG. 1;

FIG. 5 is a schematic and block diagram of a system similar to that shown in FIG. 1 employing air or open core solenoids for premagnetization and reference field generation; and FIG. 6 is a vector diagram displaying the orientation of the various magnetic and electromagnetic fields used in the system of FIG. 5.

Figure 3:
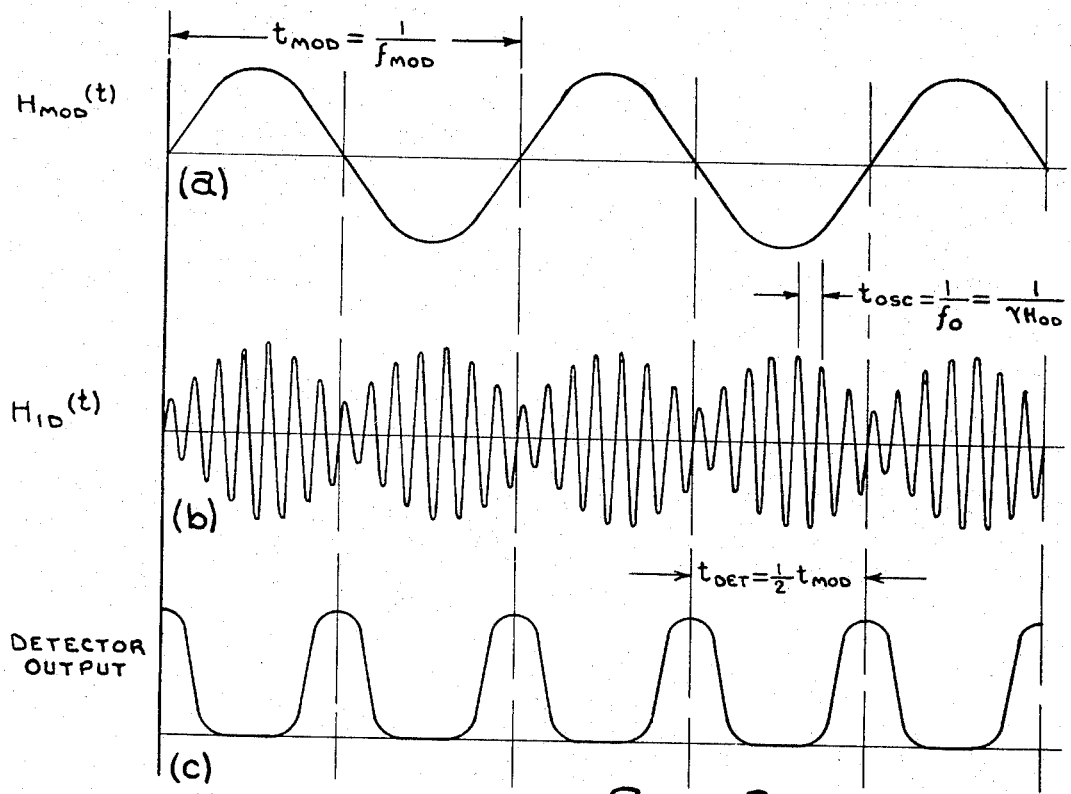
FIGS. 3 and 4 are graphical illustrations of typical wave forms of various fields and voltages within the system diagrammed in FIG. 1.

Referring now to the embodiment shown in FIG. 1, the fluid, the flow of which is to be measured, is conducted through a conduit 10 of uniform unobstructed interior from the left to the right. Such fluid may consist of a substance comprised of many elements at least one of which has an atomic nuclei which displays a nuclear magnetic moment $\mu$, and angular momentum $\hbar I$ where $\hbar$ is Planck's constant and I is the spin quantum number. The atomic nuclei of most nuclei are in this category. A strong permanent magnet or electromagnet diagrammatically indicated at 12 generates a unidirectional field herein designated $H_{OM}$. A feature of this invention is that no particular requirements are placed on the homogeneity of such field. The effect of the field $H_{OM}$ upon fluid as it passes through the conduit 10 is to generate a nuclear paramagnetization in such fluid represented by a vector $M_{Z1}$ which is colinear with $H_{MO}$ as shown in FIG. 2. The magnitude of $M_{Z1}$ is expresed as:

$$M_{Z1} = \chi_0 H_{OM}\left(1 - \epsilon^{-\frac{d_1}{vT_1}}\right) \quad (1)$$

where $\chi_0$ is the static nuclear paramagnetic susceptibility of such fluid, $v$ is the velocity of such fluid, $d_1$ is the effective length of $H_{OM}$ along the axis of conduit 10, and $T_1$, is the spinlattice relaxation time associated with the nuclei being resonated in such fluid. The fluid is thus premagnetized and has magnetization $M_{Z1}$ as it leaves field $H_{OM}$. As such fluid continues along the conduit 10, the magnetization thus imparted will decay. It is therefore important that the initial premagnetization be sufficient to provide values at places further downstream which can be detected by NMR detector devices as hereinafter described. It has been found that the values of $H_{OM}$ and $d$, must be such as to produce a value for $M_{Z1}$ which is greater than 50 times $\chi_0$. The decay at the following selected places downstream will be in accordance with the following expressions:

$$M_{Z2} = M_{Z1}\epsilon^{-\frac{d_2}{vT_1}} \quad (2)$$

$$M_{Z3} = M_{Z1}\epsilon^{-\frac{(d_2+d_3)}{vT_1}} \quad (3)$$

where $d_2$ is the distance along the axis of conduit 10 from the downstream end of the effective length of the $H_{OM}$ field to the axis of a rotation field $H_{1R}$ supplied by opposed coils 14 and $d_3$ is the distance along such conduit from the latter axis to the axis of a modulating field $H_{MOD}$ supplied by opposed coils 16.

As the fluid passes downstream through the conduit 10 from the $H_{OM}$ field it enters another unidirectional field $H_{OD}$ created by another magnet diagrammatically indicated at 18. This magnet may be a permanent magnet or an electromagnet. The $H_{OD}$ field provides the device with the resolution sought and interacts with the $H_{1R}$ and $H_{MOD}$ fields to provide NMR signals with good signal-to-noise ratio. To accomplish this, such field must have a high degree of homogeneity (say 1 part in 10,000). It is this field which also supplies a frame of reference for the rotational field $H_{1R}$ and a detector field $H_{1D}$ supplied by a coil 20 encircling the conduit 10, whereby the system of dipoles or nuclei are precessed or twisted as they pass through such fields.

The level of magnetization $M_{Z3}$ at the end of $d_3$ is measured by the slow passage transversals (non-resonant to resonant) of the nuclear magnetic resonance effected by the detector field $H_{1D}(t)$ and the modulating field $H_{MOD}(t)$ operating in the reference frame field $H_{OD}$. The detector field $H_{1D}$ is generated by the output current of a radio frequency oscillator 22 which is proportional to $$H_{1D}(t) = H_1 \cos(\gamma H_{OD} t)$$

A modulation current supply 24 provides a current which generates the field $$H_{MOD}(t) = H_{MOD} \cos \omega_{MOD} t$$

The wave forms and frequency of both these fields are correlated as shown in FIG. 3. Comparison shows that the total Z-axis field (see FIG. 2) through the fluid volume surrounded by coil 20 is $$H_{OD}(t) = H_{OD} + H_{MOD} \cos(\omega_{MOD} t)$$

Each time $\omega_{MOD} t$ is in the vicinity of $n\pi/2, H_{OD}(t)$ approaches $H_{OD}$, the nuclear resonant condition $\omega = \gamma H_{OD}$ is fulfilled, and the fluid absorbs radio frequency power from the field $H_{1D}$. This absorption causes a momentary drop in the voltage across the coil 20 as indicated in FIG. 3(b), because the radio frequency oscillator 22 is essentially a constant current source. The absorption during the slow passage resonance traversal generates a harmonic modulation of $H_{1D}(t)$ of about 0.05% (exaggerated in FIG. 3(b) for clarity) with period $t_{DET}$ equal to one-half the period of $H_{MOD}(t)$. The magnitude of the peak amplitude modulation in percent is given by $$\frac{628\eta M_{Z3} Q}{\Delta A} \quad (4)$$

Where:

$\eta$ = coil 20 filling factor equal to intra-coil fluid volume divided by intra-coil volume,
$M_{Z3}$ = fluid magnetization in gauss,
$\Delta H$ = the inhomogeneity in the $H_{OD}$ field over the fluid intra-coil volume in coil 20, and
$Q$ = coil quality factor.

This modulation is detected in a detector 26 whose output is the envelope of the modulation as shown in FIG. 3(c). The detector output pulse height is a measure of the magnetization $M_{Z3}$ of fluid within the coil 20.

Having provided the means for continuously detecting the level of magnetization $M_{Z3}$ at the end of $d_3$, the presence of a small bolus of no measurable level of magnetization will be detected as it passes through the detector field $H_{1D}$. An essential feature of this invention is the creation of such a bolus a short distance upstream from the detection field in repeated self-sustaining pulses keyed in from the radio frequency oscillator 22 by the gate 30 which was triggered by the output of the detector 26.

This bolus is formed by the rotational field $H_{1R}$ generated by the opposed coils 14 placed on opposite sides of the conduit 10 so that the axis of this field is transverse to such conduit and substantially perpendicular to the axis of the fields $H_{0M}$, $H_{0D}$, and $H_{1D}$. This relationship reduces coupling between fields $H_{1R}$ and $H_{1D}$. As previously pointed out when the fluid reaches the downstream end of $d_2$ its magnetization level is indicated as $M_{Z2}$ and is dependent on $M_{Z1}$. It is aligned along the Z-axis of FIG. 2. When a pulse of the field $H_{1R}$ passes through the fluid the Z-axis magnetization M is rotated about the X-axis in the Y–Z plane of FIG. 2.

Figure 4:
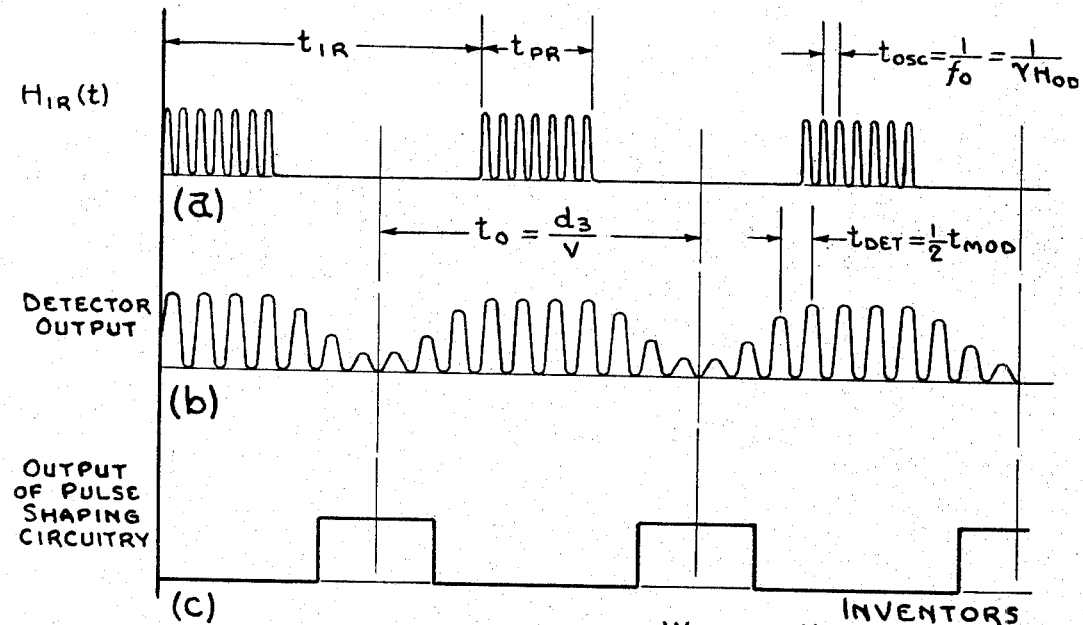

The rotational field $H_{1R}$ is generated by means of a current from the output of a radio frequency amplifier 28 gated into coils 14 by an electronic gate 30. The input to such radio frequency amplifier is a voltage proportional to $\cos \gamma H_{0D} t$ from the radio frequency oscillator 22. The rotation of $M_{Z1}$ in the Y–Z plane causes the Z-axis component thereof to vary approximately cosinusodially according to $\cos(\gamma H_{1R} t_{1R})$. If $H_{1R}$ is gated on long enough and has proper magnitude so that $H_{1R} t_{1R}$ equals a multiple of $\pi/2$, then the Z-axis component of M is driven to its minimum value. Thus $t_{1R}$ in FIGURE 4a is given by $\pi/(2\gamma H_{1R})$. If such a pulse of $H_{1R}$ is applied by means of coils 14, and $t_{1R}$ is short relative to the quotient of the length of coil 20 and maximum fluid velocity $v_{\max}$, then the value of $M_Z$ in the fluid bolus occupying coil 20 during $t_{1R}$ is reduced approximately to zero. The Z-axis magnetization in the fluid preceding and following this bolus is approximately $M_{Z2}$ and $M_{Z3}$ respectively, so the bolus is essentially "tagged" with respect to the adjacent fluid. When this tagged bolus moves downstream to occupy coil 20, the reduced magnitude of $M_Z$ in the bolus causes the output of detector 26 to fall as indictaed in FIGURE 4(b). The envelope of such output has the form of a pulse during the passage of the tagged bolus. For each pulse of $H_{1R}$ gated to coil 20, there is a response pulse on the envelope of the output of detector 26. This response pulse is shaped in a pulse shaping circuitry 32 as indicated in FIGURE 4(c) and used to gate another $H_{1R}$ pulse. In this manner the control loop is closed and the pulsing of coils 14 by gate 30 is repetitive and self-sustaining. The pulse period, or time between pulses at the output of the pulse shaping circuitry 32 is precisely equal to $d_3/v$, and each pulse corresponds to the passage of a volume of fluid equal to the internal volume of conduit 10, existing between coils 14 and coil 20. The pulse repetition rate at the output of pulse shaping circuitry 32 is proportional to the velocity $v$ of the fluid passing through the conduit.

Pulses from the pulse shaping circuitry 32 are counted and totalized by means of a counter 34 whose reading is proportional to fluid quantity. Such pulse rate is converted to an analog voltage by means of a frequency to analog converter 36 whose output is sent to a meter 38, or other indicating device such as a chart recorder, for indication of flow velocity.

The accuracy of these measurements of flow quantity and flow rate is dependent only upon the precision with which the arrival of the tagged bolus at coil 20 is detected. For this reason the modulation period $t_{MOD}$ should be very much less than the time between output pulses $t_0$ as indicated in FIGURE 4(b). Also coils 14 and coil 20 should have as short a dimension along the Y-axis as practical and $d_3$ should be as large as possible consistent with the homogeneity of the $H_{0D}$ field and the desired resolution of the quantity readout. Accuracy greater than that previously obtained has been indicated for devices of this type.

Other methods for the measurement of $M_{Z3}$ in coil 20 may be used. The detection method should not be construed as limited to the use of slow passage NMR resonance traversals. For example, 90° pulse can be applied to coils 14 and a succession of intense 90° pulses can be applied to coil 20 with period $t_{PI}$ very short relative to $t_0$. After each such 90° pulse on coil 20, the free induction decay of M can be measured using coil 20 as input to a radio frequency receiver. The magnitude of the free induction decay is indicative of the value of $M_{Z3}$. Hence the train of successive induction decays following 90° pulses applied to coil 20 will carry an envelope in response to a 90° pulse applied to coil 14 similar to that sketched for slow passage resonance traversals in FIGURE 4(b).

Referring now to the modification of this device and system shown in FIGS. 5 and 6, there are the same magnetic fields used for the same purposes as in the first modification. Accordingly they are identified by the same symbol. However their directional axes have been changed without changing their relative functions. The premagnetization field $H_{0M}$ is generated by a high intensity air core coil or solenoid 40 encircling a conduit 42 and the homogeneous reference field $H_{0D}$ is generated by an air core coil or solenoid 44 also encircling such conduit. These coils are connected to a supply of direct current 46 and hence the central axes of these fields are aligned with the axis of such conduit. The coils are wound so that the direction of the field through the core is the same in each. These fields are therefore shown graphically lying along the Y-axis as shown in FIG. 6.

The detector field $H_{1D}$ is generated by a pair of coils 48 on opposite sides of the conduit and the axis of this field is perpendicular to the conduit and the $H_{0D}$ field. The modulating field $H_{MOD}$ is generated by a coil 50 also encircling the conduit 42 so that its axis is perpendicular to that of field $H_{1D}$. Hence the $H_{1D}$ field is shown graphically lying along the Z-axis as shown in FIG. 6.

The rotational field $H_{1R}$ is positioned the same as in the first modification and is generated by a pair of coils 52. The axis of this field is perpendicular to both the $H_{0M}$ and $H_{0D}$ fields and to the axis of the $H_{1D}$ field and thus is shown lying along the X-axis in FIG. 6.

The air core coil 40 generates an intense field $H_{0M}$ due to the passage of a large but unregulated current from the direct current supply 46. Air core coil 44 is preferably a solenoid with end effect compensation coils to minimize axial field inhomogeneity near the center of the solenoid. A well regulated but relatively weak current is supplied from the direct current supply to generate a steady $H_{0D}$ field.

As in the first modification: the modulating field $H_{MOD}$ is created by a modulation current supply 54 of proper value to make $H_{MOD}(t)$ effective for bringing about slow passage resonance traversals; the detector field $H_{1D}$ is controlled by a radio frequency oscillator 56; the rotational field $H_{1R}$ is controlled by a radio frequency amplifier 58 connected to the coils 52 by a electronic gate 60; the oscillator 56 is connected with a detector gate 60; the oscillator 56 is connected with a detector 62 which in turn is connected with pulse shaping circuitry 64. These components all function the same as those of the first modification with a counter 66, frequency to analogy converter 68 and meter 70 giving similar readings. Except for the changes in field orientation described above, the operation of the pulsed NMR system for flow rate measurement shown in FIGS. 5 and 6 is identical with that of the system described in FIGS. 1 to 5.

The change from Alnico V permanent magnets or iron core electromagnets of the first modification to air core solenoids of this modification provides reduced weight. Further the field homogeneity along the axis of the compensated air core solenoids can easily be made very good along the central 50% of the solenoid's axis. Thus there is eliminated the costly precision machining of the magnet pole pieces necessary to obtain similar field homogeneity in a permanent or electromagnet.

To assist those not highly skilled in the art of pulsed NMR flow meter techniques to understand the foregoing description, equations, expressions, and symbols appearing in the drawings the following definitions of the standard symbols and abbreviations are set forth:

NMR=Nuclear magnetic resonance—in general a phenomenon of the atomic nuclei which display spin (angular gyroscopic moment or nuclear angular momentum), and magnetic moment and on resonance is disturbed by precessional motions;
DET=Detector;
$d_1$=Length of field $H_{0M}$ along the conduit;
$d_2$=Length along the conduit from downstream end of $H_{0M}$ to the center of field $H_{1R}$;
$d_3$=Length along the conduit from the center of field $H_{1R}$ to the center of field $H_{1D}$;
$\epsilon$=Base of natural logarithm;
$f_0$=Larmor precession frequency;
$f_{MOD}$=Frequency in cycles per sec. of modulating field $H_{MOD}$;
$\hbar$=Planck's constant divided by $2\pi$ equal to $1.05450 \times 10^{-2}$ erg. sec.;
$H_{0M}$=Main fixed magnetic field in gauss to generate nuclear paramagnetization represented by vector $M_{Z1}$ colinear with field $H_{0M}$;
$H_{0D}$=Fixed magnetic field in gauss with high degree of homogeneity to supply frame of reference for NMR detector and field $H_{1R}$ and represented by vector $M_{Z2}$ colinear with field $H_{1R}$;
$H_{1R}(t)$=Pulsed high (radio) frequency magnetic field in gauss with an axis normal to the fields $H_{0M}$ and $H_{1D}$ to rotate the vector $M_{Z1}$;
$H_{1D}(t)$=Radio frequency magnetic field in gauss normal to the fields $H_{0M}$, $H_{0D}$, and $H_{1R}$;
$H_{MOD}(t)$=Sinusoidally varying magnetic field modulating field $H_{0D}$.
I=Proton spin quantum number;
$M_{Z1}$=Z-axis magnetization in fluid leaving field $H_{0M}$;
$M_{Z2}$=Decayed value of Z-axis magnetization $M_{Z1}$ (before rotation) in fluid in field $H_{1R}$;
$M_{Z3}$=Decayed value of Z-avis magnetization $M_{Z1}$ (not rotated) in fluid in fields $H_{1D}$ and $H_{MOD}$;
$n$=A small whole number;
Q=Coil quality factor;
$t$=Time in seconds;
$t_{DET}$=Time in seconds between successive peaks of detector output;
$t_{1R}$=Time in seconds between pulses of field $H_{1R}$;
$t_{MOD}$=Time in seconds for one complete cycle of modulation of field $H_{MOD}$;
$t_0$=Time in seconds between successive nulls in detector output caused by the passage of the small bolus of rotated vector of magnetization $M_{Z1}$;
$t_{OSC}$=Time in seconds between success peaks of the radio frequency magnetic field $H_{1D}$;
$t_{PR}$=Time in seconds for the duration of the pulse of the field $H_{1R}$;
$T_1$=Fluid spin-lattice relaxation time;
$v$=Velocity of fluid along conduit 10;
$\gamma$=Gyromagnetic ratio of proton equal to the ratio of $\mu$ to $I\hbar$ or $2.67519 \times 10^4$ radians per sec. per gauss;
$\Delta_H$=Inhomogeneity in the field $H_{0D}$ over the volume of fluid within the coil providing the field $H_{1D}$;
$\eta$=RF coil filling factor, the fraction of RF coil volume occupied by the fluid;
$\mu$=Proton magnetic moment—$1.41049 \times 10^{-23}$ ergs. per gauss;
$\chi_0$=Static nuclear magnetic susceptibility;
$\omega$=Angular frequency in radians per sec;
$\omega_{MOD}$=Angular frequency of field $H_{MOD}$.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. A system for measurement of flow of a fluid having at least one element, the atomic nuclei of which display a nuclear magnetic moment and angular momentum, which comprises:

a conduit for continuously conducting the fluid in a straight line along a confined path;
first magnetic field generating means juxtaposed with said conduit for producing a high intensity unidirectional magnetizing field within said conduit through which the fluid passes, to induce a nuclear paramagnetization in the fluid having a vector collinear with said field;
tagging means juxtaposed with said conduit for generating a pulsed magnetic field within said conduit for altering the nuclear magnetization within a bolus of said fluid to thereby tag said bolus with respect to the fluid preceding and following said bolus;
second magnetic field generating means spaced downstream from said first magnetic field generating means, for producing a homogeneous unidirectional magnetic field within said conduit downstream from said first magnetic field generating means, said homogeneous field being relatively weak as compared with said magnetizing field;
means for inducing nuclear magnetic resonance in said fluid within said homogeneous field; and
means for detecting the passage of said tagged bolus a short distance downstream from said pulsed magnetic field, said last named means including a receiver coil juxtaposed with said conduit within said homogeneous magnetic field and having its axis perpendicular with the direction of said pulsed magnetic field, and means for detecting a change in said resonance as a result of the passage of said tagged bolus.

2. Apparatus according to claim 1, wherein said tagging means comprises a tagging coil juxtaposed with said conduit, means for generating a high frequency signal and means for supplying a pulse of said high frequency signal to said tagging coil, said tagging coil positioned with its axis orthogonal with the directions of the magnetic field produced by said first magnetic field generating means and the axis of said receiver coil.

3. Apparatus according to claim 1, wherein said second magnetic field generating means comprises a coil juxtaposed with said conduit, a source of direct current, and means interconnecting said coil and said source to cause said coil to generate a homogeneous unidirectional field.

4. Apparatus according to claim 1, wherein said means for inducing nuclear magnetic resonance comprises a high frequency coil juxtaposed with said conduit within said homogeneous magnetic field, a source of a high frequency signal, and means for connecting said high frequency coil with said source, said coil being disposed in orthogonal relation with the axis of said receiver coil and the direction of said pulsed magnetic field.

5. Apparatus according to claim 3, wherein said means for inducing nuclear magnetic resonance comprises a high frequency coil, a source of high frequency signal, and means connecting said high frequency coil with said source, said high frequency coil and said receiver coil both being mounted on the outside of said conduit and between said conduit and said coil for generating said homogeneous field.

6. A system as claimed in claim 1 in which:
the detection means is connected to the means for supplying the pulsed high frequency magnetic field to trigger each pulse and accomplish repetitive and self-sustaining operation.

7. Apparatus according to claim 1, including means for modulating the intensity of said homogeneous field in the vicinity of said receiver coil, with respect to the intensity of said homogeneous field in the vicinity of said high frequency magnetic field.

8. Apparatus according to claim 7, wherein said modulating means comprises a modulating coil disposed with its axis aligned with said homogeneous field, and means for supplying an audio frequency signal to said coil.

9. Apparatus according to claim 1, wherein said magnetizing field is oriented in parallel with the direction of flow of said fluid.

10. Apparatus according to claim 2, including means for supplying a pulse of a high frequency signal to said tagging coil, said pulse having a duration to rotate said vector through 90°.

References Cited

UNITED STATES PATENTS 3,024,410   3/1962   Moser _____ 324—0.5
3,191,119   6/1965   Singer _____ 324—0.5

OTHER REFERENCES

"Measuring Fluid Velocity by Nuclear Resonance," J. R. Singer, Electronics, Apr. 1, 1960, pp. 77–78.

"Gas Flow Speedometer," G. L. Mellen, Electronics, February 1950, pp. 80–81.

RUDOLPH V. ROLINEC, *Primary Examiner.*

MICHAEL J. LYNCH, *Assistant Examiner.*

U.S. Cl. X.R.

73—194

UNITED STATES PATENT OFFICE
CERTIFICATE OF CORRECTION

Patent No. 3,419,793                                    December 31, 1968

William K. Genthe et al.

It is certified that error appears in the above identified patent and that said Letters Patent are hereby corrected as shown below:

Column 2, line 20, "manimal" should read -- minimal --; line 50, "werein" should read -- wherein --. Column 3, line 40, "$H_{MO}$" should read -- $H_{OM}$ --. Column 4, line 48, "A" should read -- H --. Column 7, line 33, "avix" should read -- axis --.

Signed and sealed this 17th day of March 1970.

(SEAL)
Attest:

Edward M. Fletcher, Jr.                     WILLIAM E. SCHUYLER, JR.
Attesting Officer                                    Commissioner of Patents